United States Patent [19]

Bertsche

[11] Patent Number: 4,925,331
[45] Date of Patent: May 15, 1990

[54] CONNECTOR MEMBER FOR WOOD CONSTRUCTION WORK

[76] Inventor: Peter Bertsche, Tafertsbergstr. 5, 8371 Prackenbach, Fed. Rep. of Germany

[21] Appl. No.: 103,288

[22] Filed: Oct. 1, 1987

[30] Foreign Application Priority Data

Oct. 6, 1986 [DE] Fed. Rep. of Germany ....... 3634039

[51] Int. Cl.⁵ ............................................. F16B 13/00
[52] U.S. Cl. ................................... 403/267; 403/266; 403/292; 403/319; 403/378; 52/125.4; 52/125.5; 52/707; 52/585
[58] Field of Search ............ 403/267, 268, 269, 406.1, 403/407.1, 319, 378, 292, 266; 52/125.4, 125.5, 223 L, 585, 648, 652, 704, 707, 726, 155

[56] References Cited

U.S. PATENT DOCUMENTS

| 569,235 | 10/1896 | Rockwell | 403/298 X |
|---|---|---|---|
| 724,897 | 4/1903 | Lee | 403/298 |
| 844,292 | 2/1907 | Winslow | 52/155 |
| 2,396,717 | 5/1946 | Miller . | |
| 2,772,560 | 12/1956 | Neptune | 52/125.4 X |
| 4,110,053 | 8/1978 | Buchholz | 403/292 X |
| 4,149,350 | 4/1979 | Fischer et al. | 52/704 |
| 4,211,049 | 6/1980 | Fischer | 52/704 |

FOREIGN PATENT DOCUMENTS

| 0127095 | 12/1984 | European Pat. Off. . |
| 3015934 | 10/1981 | Fed. Rep. of Germany . |
| 3318751 | 12/1984 | Fed. Rep. of Germany . |
| 8602398 | 4/1986 | World Int. Prop. O. . |

*Primary Examiner*—Andrew V. Kundrat
*Assistant Examiner*—Franco DeLiguori
*Attorney, Agent, or Firm*—Sandler & Greenblum

[57] ABSTRACT

For power transmission between a wooden beam and another building component, for example another wooden beam, a blind bore and a vent bore opening into the bottom of the bore are formed in the wooden beam. An insert body is pushed into the blind bore. This body comprises two spaced end plates whose outer cross-section corresponds to the cross-section of the blind bore, and at least one, preferably four, power-transmitting bars whose ends are welded to the opposing sides of the end plates. Bar dowels are then driven in from the side of the wooden beam so as to penetrate spaces between adjacent power-transmitting bars. Epoxy resin is then pressed into the blind bore from the outside until the entire blind bore and preferably also part of the vent bore are filled in with resin. When the resin has hardened, the resin body and the steel parts form a composite body. Connecting members may be attached to the outer end part.

19 Claims, 4 Drawing Sheets

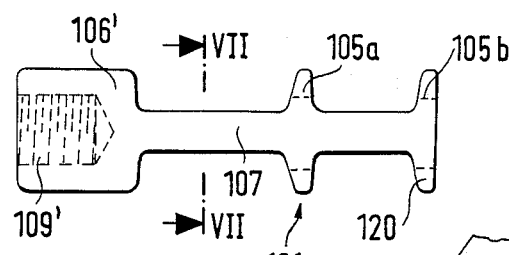
FIG.6
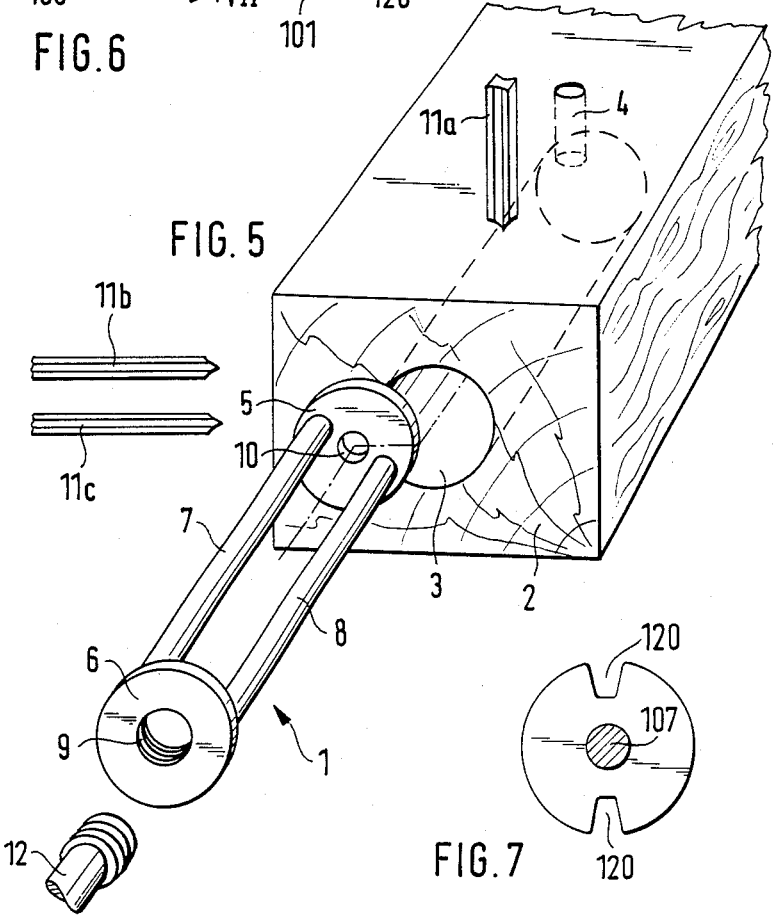
FIG.5
FIG.7

CONNECTOR MEMBER FOR WOOD CONSTRUCTION WORK

The present invention relates to a connector member for wood construction work and to a method for providing such a connector member in a wooden building component.

Wooden constructions require power-transmitting connections which withstand high tensile loads in the longitudinal direction of the adjacent wooden beams. Considerable efforts have already been made to develop connector elements which are highly stable under load, easy and cheap to produce and also allow for quick assembly. The applicant has developed a power-transmitting wood connection (German "offenlegungsschrift" no. 33, 18, 751) essentially comprising a tubular body which is pushed into a blind bore in the wooden beam and held therein by steel pins driven radially outwards into the wood. It has been shown that this wood connection meets the aforesaid requirements to a large extent, but this known construction is still in need of improvement in so far as the tubular body and the steel pins themselves required for fixing it are rather elaborate to produce and, furthermore, a complicated driving tool is required to fix the steel pins. The known connector member is fixed in a relatively short time, but this still involves so much effort that a considerable total time is required to establish a large number of connections.

The invention is based on the problem of providing a connector member for wood construction work which is cheap to produce, can be attached to the wooden building component in question in a short time and is capable of withstanding extreme tensile loads.

The solution to this problem is stated in claim 1. In the most simple embodiment, the inventive connector member includes an insert member or insert body comprising an inner end plate later located in the vicinity of the bottom of the blind bore, and a power-transmitting bar attached to the plate for example by welding, as well as at least one bar dowel which penetrates the blind bore, and the casting compound member. These parts constitute a composite block which as a connector member is able to withstand extreme tensile loads.

If only one power-transmitting bar is provided, which is then expediently welded to the center of the inner end plate, its other end can protrude out of the blind bore to allow for atachment of outer connecting members. When this connector member is subjected to tension, the power is transmitted through the power-transmitting bar to the inner end plate, from there to the casting compound body and from there, in part, directly to the walling of the blind bore and, otherwise and for the most part, via the steel dowels into the wood.

An embodiment which is somewhat more elaborate, but much more convenient to handle, is provided with a second, outer end plate whose outer cross-section is adapted to the cross-section of aperture of the blind bore, and with at least one power-transmitting bar whose ends are attached to the opposing ends of the two end plates. The outer end plate preferably has a taphole into which a connecting member, for example, a tie rod, can be screwed from the outside.

When the casting compound is pressed in, the displaced air must be able to escape. For this purpose the inner end plate has a preferably central vent hole which communicates with a vent bore in the wooden building component. If there is a taphole in the outer end plate, the casting compound is pressed into the blind bore through the taphole. The air displaced thereby escapes through the vent hole in the inner end plate and through the vent bore.

The cross-section of the blind bore and thus of one or both end plates is preferably circular or, in an embodiment not quite as favorable, rectangular or square or else, in less favorable embodiments, oval or of any polygonal shape.

The power-transmitting bars may be threaded bars, preferably structural steel pieces. The bars may be welded at the ends to the opposing sides of the end plates. However, one may also provide bores in the end plates for the power-transmitting bars to protrude into or penetrate. The bars may then be fixed on the outer sides of the end plates in any suitable manner known as such.

A particularly favorable nonpositive connection within the connector member is obtained by providing four power-transmitting bars which are disposed symmetrically — in a cross-sectional view — in the corners of a square. The cross-section of, and distance between, the power-transmitting bars are selected in such a way that the bar dowels extending perpendicular thereto penetrate the spaces between the bars. With the aid of a template the steel dowels may be driven into the wooden building component in such a way as to extend exactly between the power-transmitting bars. If structural steel pieces with a ribbed surface are used, this results in positive power transmission within the hardened composite block. Epoxy resin is preferably used as the casting compound.

The inventive connector member can be assembled very easily and quickly. After a blind bore and a vent bore opening into the bottom of said bore are formed in the wooden building component, the insert body (end plate or end plates with power-transmitting bars) is inserted into the blind bore. After the bar dowels have been driven in perpendicular to the direction of the blind bore, the casting compound is pressed into the blind bore. When the casting compound has hardened, which happens very quickly, the connector member is ready for further handling of the wooden building component.

In the following, embodiments of the invention shall be explained in more detail with reference to the drawing, in which FIG. 1 shows a cross-sectional view of a wooden beam with an inserted connector member according to cross-sectional line I—I in FIG. 2, FIG. 2 shows a schematic side view of the wooden beam provided with the connector member as in FIG. 1.

FIG. 5 shows a perspective view of a wooden beam provided with a blind bore before the connector member is inserted, FIG. 6 shows a side view with a further embodiment of a connector member, and FIG. 7 shows a cross-sectional view along line VII—VII in FIG. 6.

Figure 1:
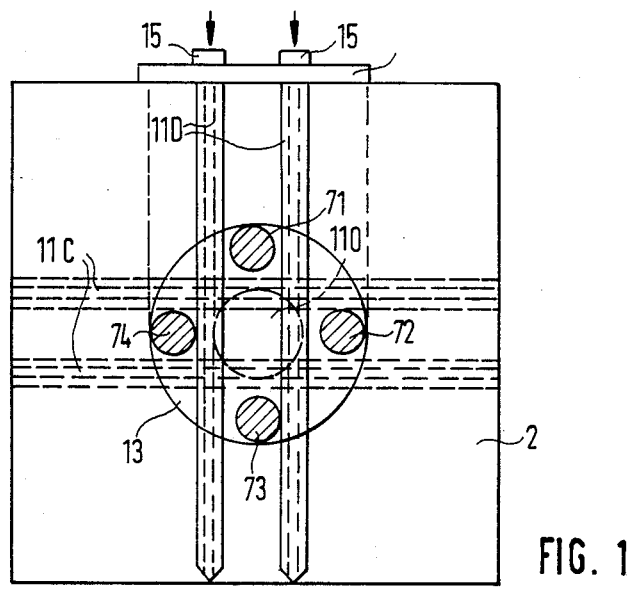

Looking first at FIG. 5, one sees a perspective view of the end of a wooden beam 2 with a blind bore 3 into which a steel insert body 1 is to be inserted and fixed.

A vent bore 4, whose function shall be explained below, opens into the bottom of blind bore 3.

Insert body 1 comprises a first end plate 5 later located on the inside, a second end plate 6 later located on the outside with its outer surface preferably flush with the end plane of beam 2, as well as two power-transmitting bars 7 and 8 welded at both ends to end plates 5 and 6. Here, power-transmitting bars 7 and 8 are structural steel parts with a ribbed surface. First end plate 5 has a central vent hole 10. Outer end plate 6 has a central threaded opening 9.

Figure 4:
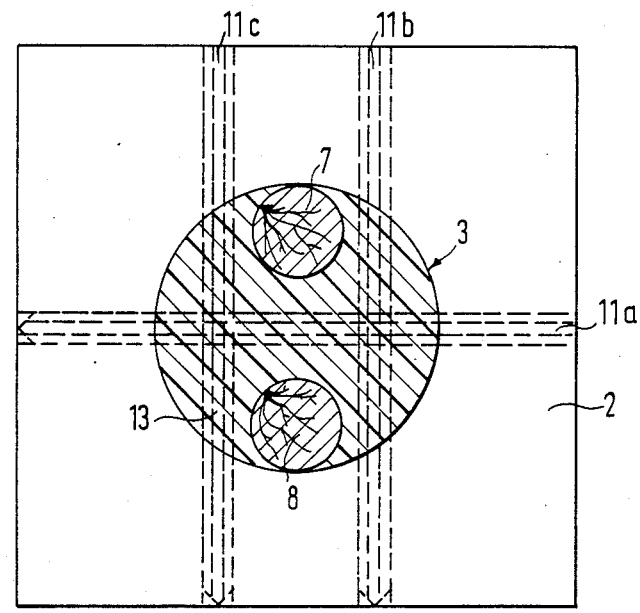
FIG. 4 shows a third embodiment of a connector member.
Figure 8:
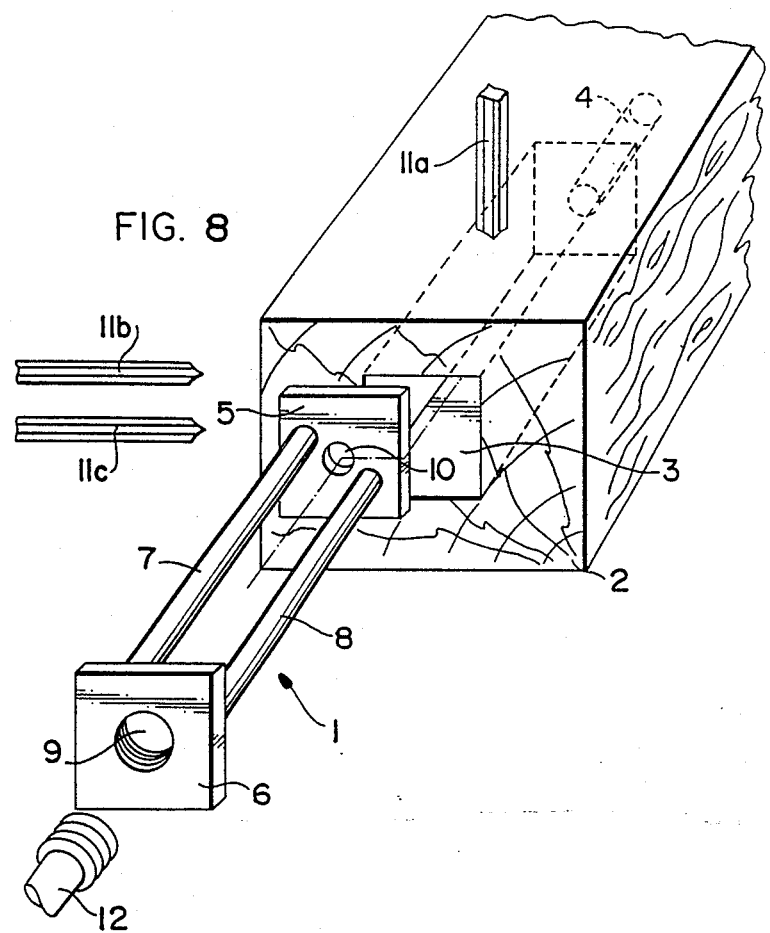
FIG. 8 shows another embodiment of a beam in accordance with the present invention provided with a blind bore before the connector member is inserted.

Blind bore 3 is dimensioned such that the outside of end plate 6 is flush with the end plane of beam 2 when insert body 1 is pushed all the way in. After insert body 1 has been inserted, bar dowels 11a and 11b, 11c are driven into the wooden beam from the top and left side, respectively, perpendicular to the blind bore and insert body 1. The lengths of bar dowels 11a, 11b, 11c are such that they penetrate the height or width of beam 2 almost completely. Driven-in bar dowel 11a runs between the two power-transmitting bars 7 and 8. Bar dowels 11b and 11c driven in from the side enclose the two power-transmitting bars 7 and 8. This is shown in detail in FIG. 4. The two end plates 5 and 6 have an outer cross-section which essentially corresponds to the cross-section of aperture of blind bore 3. The blind bore is only slightly oversized. FIG. 4 also indicates that the projection of steel dowels 11a, 11b, 11c onto the plane of end plate 5 is located on the end plate itself. The driven-in steel dowels would thus prevent insert body 1 from being pulled out of blind bore 3.

When insert body 1 is seated in blind bore 3 and the steel dowels have been driven in, epoxy resin is pressed into the blind bore through tap-hole 9 in outer end plate 6. The air displaced thereby escapes through vent hole 10 in inner end plate 5 and adjacent vent bore 4 in the wooden beam. When the epoxy resin has hardened, the resin forms a casting compound body in which power-transmitting bars 7 and 8 and bar dowels 11a, 11b and 11c are fixed within the blind bore. These parts thus form altogether a composite block which is so firmly connected with wooden beam 7 that it can take up extreme tensile loads.

Steel dowels 11a, 11b, 11c have an H cross-section, as shown specifically for bar dowel 11a in FIG. 5. These bar dowels are advantageous in that they can be driven into the wood without bores having to be made beforehand. Instead of bar dowels with an H cross-section, bar dowels with a circular cross-section may also be used. In view of the load to be expected, however, the latter must have a cross-section such that bores must be provided in the wooden beam beforehand for these round dowels.

A connecting member, for example a connecting member provided with a threaded bolt 12 (FIG. 5), may be screwed into taphole 9 in outer end plate 6.

Figure 3:
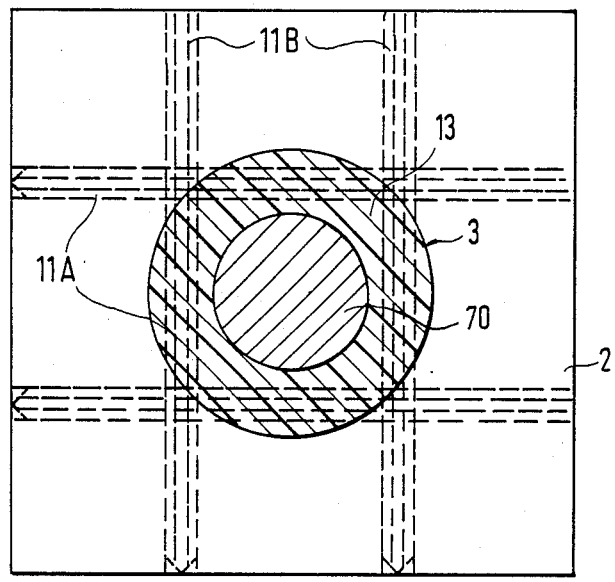
FIG. 3 shows a modified embodiment of a connector member.

The embodiment shown in FIGS. 4 and 5 is provided with two power-transmitting bars. However, one may also provide only one power-transmitting bar 70, as shown in FIG. 3. In this case the outer end plate can be dispensed with and the outer end of power-transmitting bar 70 (which is preferably a threaded bar) used for connection to outer building components. In FIGS. 3 and 4 the casting compound body is marked by reference number 13. The casting compound fills in the entire blind bore and serves to transmit power between the power-transmitting bar or bars, the end plates and the bar dowels which extend perpendicularly through the blind bore.

In the embodiment according to FIG. 3, two pairs of bar dowels 11A, 11B form a square, projected onto the plane of the end plate, said square coinciding substantially with the area of the end plate.

Figure 2:
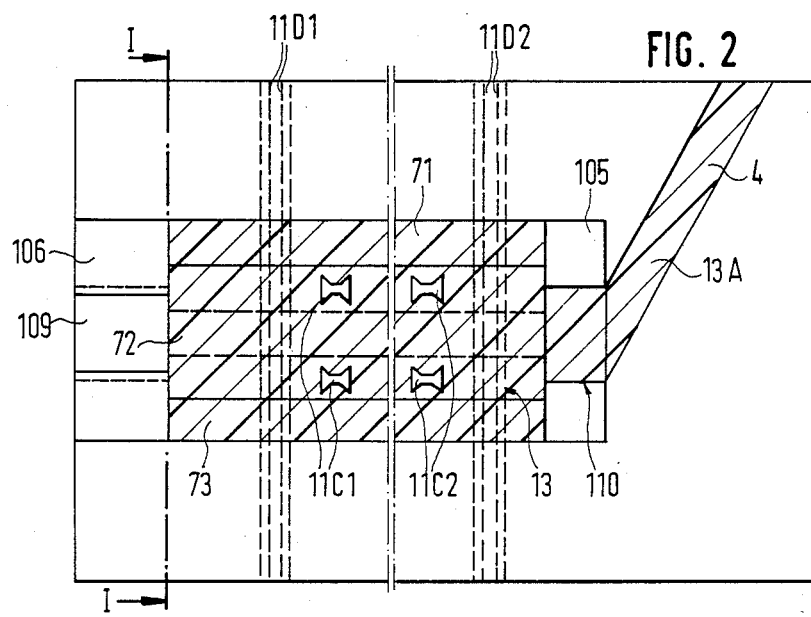

FIGS. 1 and 2 show a particularly preferred embodiment of the invention. This embodiment is provided with four power-transmitting bars 71, 72, 73 and 74 each consisting of a structural steel piece with a ribbed surface, which are welded at their ends to the opposing side surfaces of an outer end plate 106 and an inner end plate 105. As in the embodiment of FIGS. 4 and 5, inner end plate 105 has a central vent hole 110 to which vent bore 4 is connected, while outer end plate 106 has a central taphole 109.

In this connector member, the four power-transmitting bars are located on three planes in their lateral projection, thereby forming two spaces for taking up the horizontal bar dowels. On the horizontal, two pairs of bar dowels 11C1 and 11C2 are provided. Accordingly, two pairs of bar dowels 11D1, 11D2 are provided on the vertical.

In the embodiments of FIGS. 3, 4 and 5, the projections of the bar dowels toward the end plate plane are located on the end plate itself. As shown in FIG. 1, each bar dowel has adjacent thereto two power-transmitting bars on one side and one power-transmitting bar on the other side.

As shown in FIG. 2, the hardened casting compound, as casting compound body 13, 13a, fills in not only the interior of the blind bore but also vent passage 4.

In order that the bar dowels penetrate the blind bore in exactly the intended places, a template 14 (FIG. 1) is preferably employed. Template 14 is placed, aligned with the blind bore, on the side in question of wooden beam 2. Steel dowels 11 are then inserted in receiving openings 15 and driven into wooden beam 2 singly or simultaneously.

The bar dowels may have a round or profiled cross-section. Ready-to-use mortar on a cement base may be used as a casting compound instead of epoxy resin.

FIG. 6 shows a particularly preferred embodiment of the invention. In this embodiment, an insert body 101, which is inserted into a blind bore in a wodden beam, is designed as a cast steel part. A head 106' provided with a threaded opening 109' is connected to a round power-transmitting bar 107 with which a holding plate 105a and an end plate 105b are formed in one piece. Both plates 105a and 105b have gaps 120 formed therein to allow the casting compound to flow through during asemblage of the insert body.

In a further modified embodiment, a plurality of holding plates similar to holding plate 150a may also be provided along power-transmitting bar 107.

In a further modification of the embodiment of FIGS. 6 and 7, the insert body may also be equipped with a power-transmitting rod with an approximately square cross-section, whereby the holding and end plates may also have a square cross-section.

Instead of thread 109', a head bolt may also be formed onto portion 106'.

I claim:

1. A connector member for wood construction work, comprising:

(a) a first, inner end plate having an outer cross-section adapted to a cross-section of an aperture of a blind bore located in a wooden building component to take up the connector member;

(b) at least one power-transmitting bar having a cross-section which is smaller than said outer cross-section of said first, inner end plate, said power-transmitting bar extending parallel to a longitudinal axis of said blind bore connected with said first end plate and extending toward said aperture of said blind bore;

(c) at least one dowel driven into said wooden building component on a plane perpendicular to said power-transmitting bar and penetrating said blind bore in such a way that its projection onto a plane of the first end plate is located at least partly on said first end plate; and (d) a rigid casting compound body in said blind bore, filling at least a space between i) a surface of said first, inner end plate on which said powertransmitting bar is attached, ii) an inner surface of said blind bore and an iii) outer surface of said power-transmitting bar so that said casting compound body surrounding said power-transmitting bar and said dowel forms a composite block comprising said power-transmitting bar and said dowel.

2. A connector member according to claim 1, wherein said at least one power-transmitting bar comprises a connector member directed out of said blind bore.

3. A connector member according to claim 1, comprising a second, outer end plate having an outer cross-section adapted to said cross-section of said aperture of said blind bore wherein said at least one power-transmitting bar is attached at ends to opposing sides said first inner end plate and said second outer end plate.

4. A connector member according to claim 3, wherein said second outer end plate has a taphole.

5. A connector member according to claim 3, wherein said at least one power-transmitting bar is a threaded steel part which is welded at its ends to side surfaces of said first inner end plate and said second outer end plate.

6. A connector member according to claim 1, wherein said first, inner end plate has a vent hole which communicates with a vent bore in the wooden building component.

7. A connector member according to claim 1, wherein said cross-section of an end plate is circular.

8. A connector member according to claim 1 wherein said cross-section of an end plate is rectangular.

9. A connector member according to claim 1, wherein said at least one power-transmitting bar comprises a plurality of power-transmitting bars provided in a symmetrical arrangement.

10. A connector member according to claim 1 wherein said at least one power-transmitting bar comprises a structural steel piece with a ribbed surface, and said at least one power-transmitting bar is dimensioned and disposed in said blind bore such that each said dowel is positioned so that one said at least one power-transmitting bar is positioned on one side of said dowel and another said at least one power-transmitting bar is positioned on another other side of said dowel.

11. A connector member according to claim 1, wrein said casting compound body comprises epoxy resin.

12. A connector member according to claim 1, wherein said at least one power-transmitting bar is disposed in the center of said blind bore and is provided with dish-like holding plates distributed axially along its length.

13. A connector member according to claim 12, wherein said connector member is a one-piece cast part.

14. A connector member according to claim 13, wherein said holding plates have radial gaps which allow for said casting compound to flow through said radial gaps.

15. A method for providing a connector member in a blind bore of a wooden building component, comprising:

(a) boring a blind bore to have a bottom in the wooden building component, (b) boring a vent bore opening into said blind bore;

(c) inserting an insert body into said blind bore comprising at least a first, inner end plate and the at least one power-transmitting bar, (d) driving at least one dowel into the wooden building component so that said at least one bar dowel penetrates said blind bore, and (e) pressing a casting compound into an opening in said blind bore until said casting compound fills in said blind bore and at least part of said vent bore.

16. A method according to claim 15, wherein said at least one bar dowel comprises a plurality of bar dowels driven in with the aid of a template placed on the wooden building component.

17. A method according to claim 15, wherein said vent bore opens into the bottom of the blind bore.

18. A connector member for wood construction work comprising:

(a) a first, inner end plate having an outer cross-section adapted to a cross-section of an aperture of a blind bore located in a wooden building component to take up the connector member;

(b) at least one dowel driven into said wooden building component on a plane perpendicular to a power-transmitting bar and penetrating said blind bore in such a way that the projection of said dowel into a plane of said first end plate is located at least partly on said first end plate;

(c) at least one power-transmitting bar composed of steel pieces with a ribbed surface, said at least one power-transmitting bar being dimensioned and disposed in said blind bore so that each said dowel is positioned so that one said at least one power-transmitting bar is positioned on one side of said dowel and another said at least one power-transitting bar is positioned on another side of said dowel and having a cross-section which is smaller than said outer cross-section of said first, inner end plate, said power-transmitting bar extending parallel to a .longitudinal axis of said blind bore thereby connected with said first end plate and extending toward an aperture of said blind bore;

(d) a rigid casting compound body surrounding said power-transmitting bar and said dowel thereby forming a composite block.

19. A connector member for wood construction work comprising:

(a) a first, inner end plate having an outer cross-section adapted to a cross-section of an aperture of a blind bore located in a wooden build component to take up the connector member;

(b) at least one dowel driven into said wooden building component on a plane perpendicular to a power-transmitting bar and penetrating said blind bore in such a way that its projection into a plane of said first end plate is located at least partly on said first end plate;

(c) at least one power-transmitting bar is a connector member directed out of said blind bore and extending parallel to said longitudinal axis of said blind bore connected with said first end plate and extending toward an opening of said blind bore;

(d) a second outer end plate having an outer cross-section adapted to the cross-section of said aperture of said blind bore wherein said at least one power-transmitting bar is attached at ends to opposing sides of said first inner end plate and said second outer end plate; and (e) a rigid casting compound body surrounding said power-transmitting bar an said dowel thereby forming a composite block.

\* \* \* \* \*